June 22, 1954   R. K. ORTHUBER   2,682,010
CATHODE-RAY PROJECTION TUBE
Original Filed Aug. 7, 1951   3 Sheets-Sheet 1
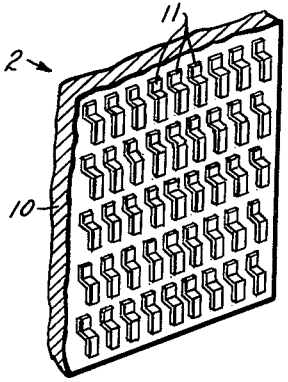
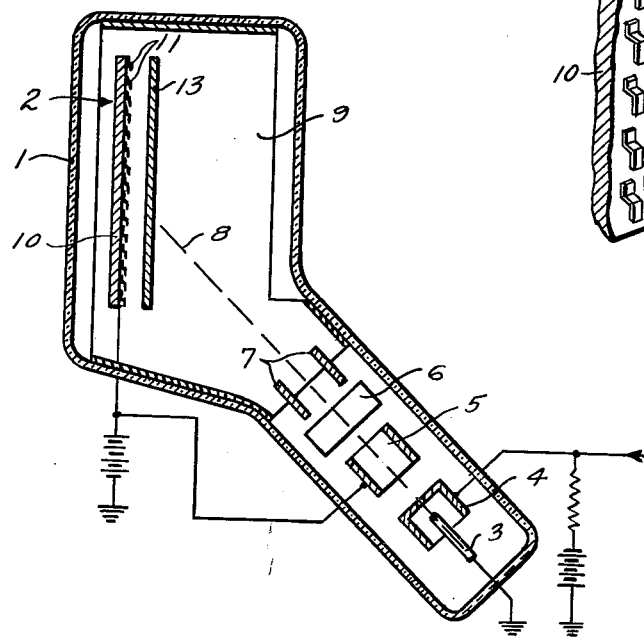
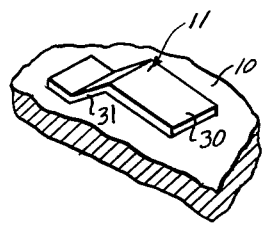
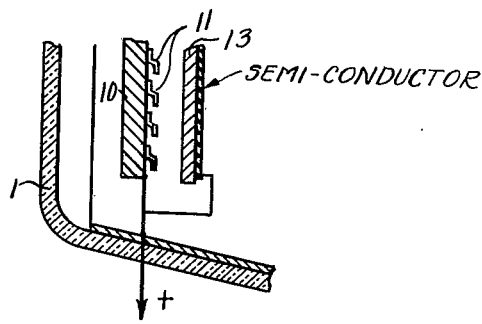
INVENTOR.
RICHARD K. ORTHUBER
BY James S. Shannon
AGENT.
Wade Koontz
and
ATTORNEY June 22, 1954

R. K. ORTHUBER 2,682,010

CATHODE-RAY PROJECTION TUBE

Original Filed Aug. 7, 1951

INVENTOR.
RICHARD K. ORTHUBER.

BY James S. Shannon
AGENT.
Wade Kroutz
ATTORNEY

June 22, 1954 R. K. ORTHUBER 2,682,010
CATHODE-RAY PROJECTION TUBE
Original Filed Aug. 7, 1951 3 Sheets-Sheet 3
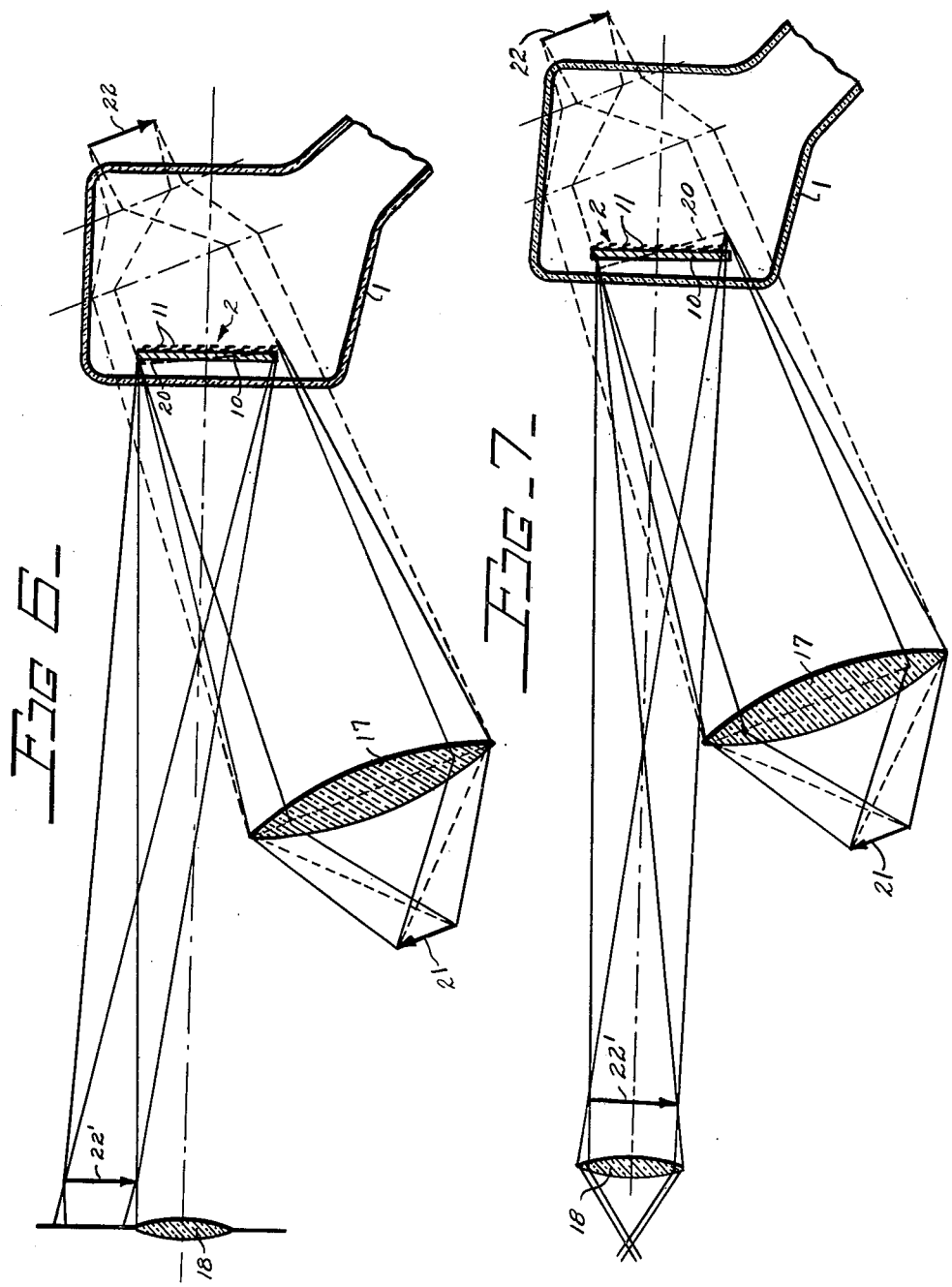
INVENTOR.
RICHARD K. ORTHUBER
BY James S. Shannon
AGENT.
Wade Kountz
ATTORNEY Patented June 22, 1954

2,682,010

UNITED STATES PATENT OFFICE 2,682,010

CATHODE-RAY PROJECTION TUBE

Richard K. Orthuber, Fort Wayne, Ind., assignor to the United States of America as represented by the Secretary of the Air Force Original application August 7, 1951, Serial No. 240,772. Divided and this application October 31, 1952, Serial No. 318,144

5 Claims. (Cl. 315—3)

(Granted under Title 35, U. S. Code (1952), sec. 266)

The invention described herein may be manufactured and used by or for the Government for governmental purposes without payment to me of any royalty thereon.

This application is a division of application Serial Number 240,772 filed August 7, 1951.

This invention relates to systems for the optical projection of the picture information contained in a video signal.

At present, cathode-ray projection tubes generally employ a fluorescent screen which must be excited at a high level in order to produce an image of sufficient brightness to be projected. Such tubes require very high acceleration voltages and current densities to obtain the necessary high level excitation of the phosphor which in turn has a comparatively short life.

It is the object of this invention to provide a cathode-ray projection tube which does not employ the usual fluorescent screen and which is capable of utilizing an external source of light such as the conventional projection lamp and condensing lens system. Briefly, the tube contains, in place of a fluorescent screen, an element which may be termed an electrostatic shutter mosaic. The mosaic consists of a multitude of flaps of elemental size mounted on a substrate which may be either transparent or opaque. The electron beam is caused to scan over a transparent dielectric element placed opposite and close to the mosaic so as to control the charge in the vicinity of the flaps. The resulting electrostatic force acting on each flap causes a bending thereof in proportion to the strength of the force. A projection lens system is used to form an image of the mosaic on the screen. Two methods of illuminating the mosaic from the projection light source are possible. In one method, in which the substrate must be transparent, light is passed through the mosaic, with each flap controlling the amount of light passing through the corresponding part of the mosaic to the projection lens as a function of the amount of bending of the flap. In the other method each elemental flap acts as a small mirror reflecting light from the projection light source into the projection lens in an amount determined by the degree of bending of the particular flap.

The brightness of the projected image obtainable with a projection system in accordance with the invention is essentially higher than the brightness produced with fluorescent screens since a light source of any desired intensity may be used. Further, the accelerating voltages and beam current intensities required are no higher than for conventional cathode-ray tubes of the direct viewing type. The disclosed projection system also has the advantage over the fluorescent type projection tube that, when the picture consists in a succession of frames, the flicker is materially reduced due to the fact that the brightness during one frame period is constant and does not decay exponentially as in the case of fluorescent materials.

A more detailed explanation of the invention will be given in connection with the specific embodiments thereof shown in the accompanying drawings, in which:

Fig. 1 shows a projection tube in accordance with the invention.

Figs. 2 and 2a show details of the electrostatic shutter mosaic.

Fig. 3 shows a method of erasing the charge produced by a scanning electron beam.

Figs. 6 and 7 show a suitable optical system utilizing the mosaic elements as reflectors.

Figure 4:
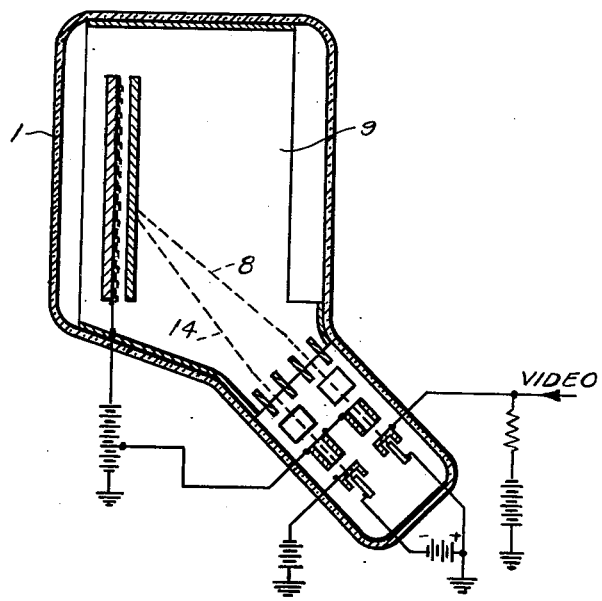
Fig. 4 shows another method of erasing the charge produced by the scanning beam.

Referring to Fig. 1 the cathode-ray tube shown comprises a glass envelope 1 containing an electrostatic shutter mosaic 2 in accordance with the invention, a cathode 3, a control electrode 4, accelerating and beam forming electrode 5, horizontal deflecting electrodes 6 and vertical deflecting electrodes 7. The electrodes cooperate to produce an electron beam 8 which is intensity modulated in accordance with a video signal applied to electrode 4 and which line scans the surface of a flat sheet of insulating material 13, which is placed parallel to the substrate 10 and close to the flaps, in the conventional manner. The tube is also provided with the conventional conductive coating 9 on its inner surface which is maintained at a high potential relative to the cathode. The coating is not present on the surfaces of the tube opposite the mosaic so as to provide transparent windows in the tube to permit projection of an image of the mosaic.

The details of the mosaic 2 are more clearly illustrated in Fig. 2 which shows a greatly enlarged fragment thereof. The mosaic comprises a substrate 10 on which are mounted a multitude of minute flaps 11 uniformly distributed over the surface of the substrate, preferably in straight horizontal rows. In general, the number of such rows in the mosaic should be at least equal to and preferably higher than the number of horizontal scanning lines contained in one complete frame in the particular television system, and the dimensions of the flaps should be roughly equal to the height of the mosaic divided by the number of lines. However, if less resolving power is required a smaller number of flaps of larger dimensions located in fewer horizontal rows may be employed. The substrate 10 may be transparent or opaque depending upon the type of optical system employed as will be pointed out later. The substrate 10 is conductive and is connected to a source of positive potential. If opaque, it may be made of a suitable metal such as aluminum. However, if the substrate is to be transparent it may be made of a suitable transparent material such as glass with a thin transparent metallic coating on which the flaps are mounted. The flaps 11 are made of metal such as aluminum, are preferably of rectangular shape and are connected to the substrate at one edge only. The ratio of thickness to length of the flaps is chosen so low that, by means of electric charges applied to them by the electron beam of the tube or acting on them, they can be bent to an amount detectable with the optical systems to be described later.

A suitable form for the flaps is shown in more detail in Fig. 2a. The portion 30 is preferably rectangular and, if the flap is to be used as a reflector, should also be flat. The flap is connected to the substrate 10 along one edge by flexible connecting part 31. The thickness of part 31 is preferably made less than the thickness of part 30 in order that substantially all of the bending will occur in part 31. This is particularly desirable when the flap acts as a reflector. Methods for making mosaics of this type are described and claimed in my joint applications Serial Nos. 269,569, 269,570, now Patent No. 2,670,523, and 269,571, filed February 1, 1952.

The electron beam in Fig. 1 operates to generate an electric field in the capacitor formed by the thin insulating sheet 13 positioned in front of the flaps and close to them. This sheet is made of a suitable insulating material such as mica or glass and is positioned parallel to and close to the mosaic 2. The beam 8 scans over the sheet 13 and produces a negative charge thereon which varies over the surface of the sheet in accordance with variations in the video modulation of the electron beam. The bending of each flap 11 is determined by the charge density on that part of sheet 12 opposite the particular flap. The flaps 11 on the mosaic 2 therefore will be bent in varying amounts in accordance with the electron or charge density image on sheet 13. The flaps are mounted directly on a conductive surface on substrate 10 which is in turn connected to a point of high positive potential. The substrate may be either transparent or opaque as required by the arrangement of the optical system. As already stated, for the transparent type the substrate may be made of a transparent insulating material such as glass having a thin transparent metallic coating on which the flaps are mounted. An opaque substrate may consist simply of a sheet of metal. In order to produce the above negative charges on sheet 13 the intensity of the electron beam should be such that the ratio of primary to secondary electrons for the insulating material used is less than unity.

If the video signal applied to the above cathode-ray tubes represents a changing image occurring in successive frames, as in a television signal, the charges applied to the insulating sheet 13 must be erased between frames and the charge-taking element returned to its reference potential. This can be achieved by the use of a semiconductor to allow the charges to leak off between frames. For this purpose a thin layer of semiconductive material is placed over the surface of insulating sheet 13 and connected to the positive inner surface of the tube as shown in Fig. 3. This layer may be made thin enough to be transparent if the optical system used for projection is such as to require light transmission through sheet 13. Suitable semiconductive materials for this purpose are silenium, lead sulphide and silicon.

Another method of erasing charges between frames employs an erasing electron beam for this purpose. Fig. 4 shows this method. The tube in Fig. 4 is similar to that in Fig. 1 except that it is provided with two complete beam generating or deflecting systems. The beam 8 is the writing beam and serves the same function as in Fig. 1. Its energy is such that the ratio of secondary electrons to primary electrons for the insulating material of sheet 13 is less than unity with the result that the elemental areas of the sheet are charged negatively by the beam. The erasing beam 14, however, produced by the other electron beam system, has sufficiently high energy that the secondary electron ratio in its case is greater than unity. The effect of beam 14 on the elemental areas of sheet 13 therefore is to charge them positively since they lose more secondary electrons than the number of primary electrons received. By this process the potential of each elemental area is raised to that of coating 9 at which point secondary emission is suppressed and the potential of the area stabilized. By arranging the deflecting voltages for beam 14 so that the beam precedes beam 8 by a short interval, such as one or two periods of the horizontal sweep frequency, each elemental area of sheet 13 is restored to the reference potential shortly before being subjected to the writing beam 8.

Other means of image erasure are also possible. For example, illumination of the charge receiving element with ultraviolet or shorter wavelength radiation between frames can effect discharge thereof by photo-emission.

Figure 5:
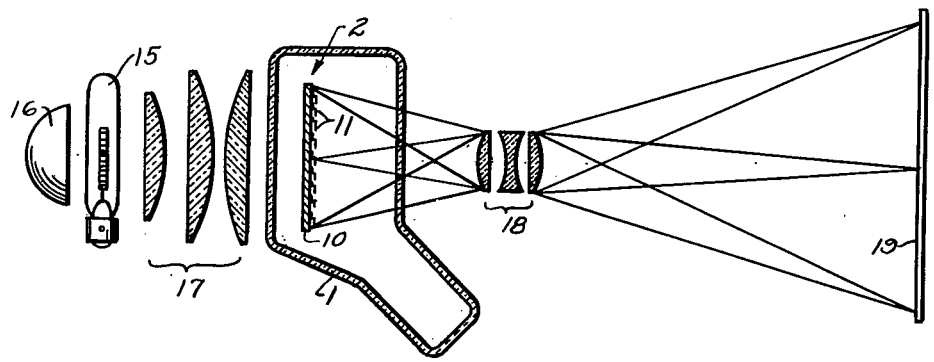
Fig. 5 shows a suitable optical system for use with transparent mosaics.

The optical system for the above tubes must provide means for uniformly illuminating the electrostatic shutter mosaic and for projecting an image of the mosaic onto a projection screen. Fig. 5 shows a simple optical system for this purpose. This system requires that the substrate 10 and insulating sheet 13 be transparent. A projection lamp 15, which may represent any suitable light source, in combination with reflector 16 and condensing lens system 17 evenly illuminate the mosaic 2 from the rear. The projection lens 18 forms an image of the front side of mosaic 2 on the screen 19. When the flaps 11 have been subjected to electrostatic forces of varying amounts through the action of an intensity modulated electron beam in the manner already explained they will be bent upward by varying amounts depending upon the degree of the force. It is evident that the greater the bending of any flap the greater the amount of light that will pass through the elemental area of substrate 10 located under the flap and the brighter will be the image of this elemental area on the screen 19. The image on screen 19 therefore will be composed of a multitude of elemental areas of light corresponding in intensity to the charges on the flaps 11, so that the image is an optical representation of the electron image on the mosaic 2.

Another optical system for projecting an image of the electrostatic shutter mosaic on a screen is shown in Figs. 6 and 7. In this system the flaps 11 must be flat and capable of specular light reflection. In addition, it is necessary that all flaps be parallel to each other when all are at the reference potential, however, they need not necessarily be parallel to the substrate in their rest position. This method of projection is applicable to mosaics with either transparent or opaque substrates, however, in Figs. 6 and 7 the application is to a tube having a transparent mosaic.

Referring to Fig. 6, if all flaps are parallel in their rest positions as specified above, the flap array acts like a single plane mirror parallel to the flaps. This imaginary reflecting surface is indicated at 20 in Fig. 6. The light from source 21 would normally be focused by condensing lens 17 to an image of the light source at 22. However, interposition of the reflecting surface 20, i. e. the flap array, causes the image to fall at 22'. The projection lens 18 produces an image of the mosaic on a projection screen. The focal lengths of the lenses 17 and 18 are so chosen that the image of the light source 22' falls within or directly behind lens 18. Also the lens 18 should have approximately the same size as the image 22'.

The system is so arranged that when flaps 11 are in their rest or no-signal condition the image 22' is displaced just to one side of the lens 18, as shown in Fig. 6, so that no light from the light source 21 enters the lens and the screen is dark. The arrangement is also such that when all flaps have their maximum negative charge the resulting outward bending thereof, which may be represented by a counterclockwise rotation of reflecting surface 20, is just sufficient to bring the image 22' wholly within the boundaries of lens 18, as shown in Fig. 7, so that the screen has its maximum brilliance.

Actually the image 22' is composed of a multitude of identical superimposed images one of which is contributed by each of the flaps 11 of the mosaic. Hence the action of each individual flap is identical to the action of reflecting surface 20. Therefore, variation of the electrostatic force on any flap as a result of the action of the electron beam causes variations in the position of the image 22' due to the particular flap relative to the lens 18, resulting in a corresponding variation in the brightness of the image of the flap on the projection screen. All of the elemental areas of light thus formed constitute an optical image corresponding to the electron image on the mosaic.

The projection system shown in Figs. 6 and 7 is equally applicable to a mosaic having an opaque substrate. In this case the light source and projection lens are located on the same side of the mosaic as the electron beam and reflection takes place from the top rather than the bottom surfaces of the flaps. The principle of operation, however, is the same. This arrangement, of course, can also be used with a transparent substrate if desired.

I claim:

1. A cathode-ray projection tube comprising an evacuated envelope, a mosaic in said envelope comprising a flat substrate of conductive material, a multitude of flaps each consisting of a thin flat substantially rectangular metallic sheet of elemental area and an attaching member more flexible than said sheet joined to one edge of said sheet and to said substrate for flexibly attaching said sheet to said substrate, a thin plate of insulating material positioned parallel to the flap side of said substrate and close to said flaps, a cathode, beam forming and beam intensity controlling means in said envelope for directing an electron beam of variable intensity against the surface of said plate remote from said flaps for negatively charging the area of said surface struck by said beam in proportion to the intensity of said beam, means for maintaining said conductive substrate at a positive potential relative to said cathode, means for maintaining the inner walls of said envelope in the vicinity of said flaps and said plate at a positive potential relative to said cathode, beam deflecting means for line scanning the said remote surface of said plate, and means for removing the negative charge from said plate between successive scannings.

2. Apparatus as claimed in claim 1 in which said plate is transparent, the walls of said envelope opposite the faces of said substrate are transparent and said substrate is transparent, said substrate having a thin transparent conductive coating between its surface and said flaps.

3. Apparatus as claimed in claim 1 in which the faces of said flaps are capable of specular reflection.

4. Apparatus as claimed in claim 1 in which said last named means consists of a thin layer of semiconductive material on the scanned surface of said plate connected to a point of positive potential relative to said cathode.

5. Apparatus as claimed in claim 1 in which said last named means comprises second electron beam forming means for producing a beam of electrons of sufficient energy that the ratio of secondary to primary electrons for the plate material used is greater than unity, and means for line scanning the said remote surface of said plate with said second beam following each scanning thereof by said first beam.

References Cited in the file of this patent

UNITED STATES PATENTS

| Number | Name | Date |
|---|---|---|
| 2,025,143 | Zworykin | Dec. 24, 1935 |
| 2,128,631 | Eaton | Aug. 30, 1938 |
| 2,276,359 | Von Ardenne | Mar. 17, 1942 |